(12) United States Patent
Vitiello et al.

(10) Patent No.: US 11,408,478 B2
(45) Date of Patent: Aug. 9, 2022

(54) JOINT FOR TRANSMITTING A TORSIONAL LOAD WITH ELASTIC RESPONSE

(71) Applicant: SCUOLA SUPERIORE DI STUDI UNIVERSITARI E DI PERFEZIONAMENTO SANT'ANNA, Pisa (IT)

(72) Inventors: Nicola Vitiello, Pontedera (IT); Francesco Giovacchini, Pisa (IT); Andrea Baldoni, Perugia (IT); Marco Cempini, Terricciola (IT)

(73) Assignee: SCUOLA SUPERIORE DI STUDI UNIVERSITARI E DI PERFEZIONAMENTO SANT'ANNA, Pisa (IT)

( * ) Notice: Subject to any disclaimer, the term of this patent is extended or adjusted under 35 U.S.C. 154(b) by 657 days.

(21) Appl. No.: 16/309,285

(22) PCT Filed: Jun. 14, 2017

(86) PCT No.: PCT/IB2017/053531
§ 371 (c)(1),
(2) Date: Dec. 12, 2018

(87) PCT Pub. No.: WO2017/216740
PCT Pub. Date: Dec. 21, 2017

(65) Prior Publication Data
US 2019/0331186 A1 Oct. 31, 2019

(30) Foreign Application Priority Data
Jun. 17, 2016 (IT) .................. 102016000062595

(51) Int. Cl.
*F16D 3/72* (2006.01)
*F16F 1/14* (2006.01)
(Continued)

(52) U.S. Cl.
CPC .................. *F16F 1/14* (2013.01); *F16D 3/72* (2013.01); *B29C 53/583* (2013.01);
(Continued)

(58) Field of Classification Search
CPC ...... F16F 1/14; F16D 3/72; F16D 3/66; F16D 3/74; B29C 53/583; B29L 2031/75; B60G 2202/1424; B60G 2206/42
See application file for complete search history.

(56) References Cited

U.S. PATENT DOCUMENTS 3,345,831 A * 10/1967 Boole ...................... F16D 3/68
464/74
4,690,661 A * 9/1987 Fredericks ................ F16D 3/72
464/78
(Continued)

FOREIGN PATENT DOCUMENTS

DE 3822417 A1 1/1989
EP 0942192 A1 9/1999
(Continued)

OTHER PUBLICATIONS

Italian Search Report from IT Application No. IT UA 20164465, dated Mar. 10, 2017.
(Continued)

*Primary Examiner* — Thomas W Irvin
(74) *Attorney, Agent, or Firm* — Workman Nydegger

(57) ABSTRACT

A transmissive joint has an elastic response for transmitting a torsional load capable of ensuring the transmission in the absence of coaxiality between two actuating and actuated devices, and allowing the internal passage of cabling or possible accessory components along the axis of transmission/torsion.

12 Claims, 4 Drawing Sheets

(51) Int. Cl.
   *B29C 53/58* (2006.01)
   *B29L 31/00* (2006.01)

(52) U.S. Cl.
   CPC ... *B29L 2031/75* (2013.01); *B60G 2202/1424* (2013.01); *B60G 2206/42* (2013.01)

(56) References Cited

U.S. PATENT DOCUMENTS

| | | | | |
|---|---|---|---|---|
| 4,790,700 | A * | 12/1988 | Schwartzman | B23B 31/207 |
| | | | | 267/181 |
| 5,160,121 | A * | 11/1992 | Bartholomew | F16F 1/371 |
| | | | | 267/136 |
| 5,238,454 | A * | 8/1993 | Schmidt | F16D 3/72 |
| | | | | 464/87 |
| 6,012,494 | A * | 1/2000 | Balazs | A61M 25/0138 |
| | | | | 138/119 |
| 6,241,224 | B1 | 6/2001 | Leibman | |
| 8,480,054 | B2 * | 7/2013 | Pintauro | F02B 39/00 |
| | | | | 251/77 |
| 9,951,823 | B2 * | 4/2018 | Giovacchini | F16D 3/66 |
| 10,948,022 | B2 * | 3/2021 | Giovacchini | F16D 3/72 |
| 2006/0276247 | A1 * | 12/2006 | Martinez | F16C 1/02 |
| | | | | 464/78 |
| 2006/0281566 | A1 * | 12/2006 | Lee | F16D 3/52 |
| | | | | 464/149 |
| 2016/0215827 | A1 * | 7/2016 | Giovacchini | F16D 3/72 |
| 2017/0328416 | A1 * | 11/2017 | Maw | E21B 17/05 |
| 2018/0209484 | A1 * | 7/2018 | Giovacchini | F16D 3/66 |
| 2019/0128334 | A1 * | 5/2019 | Pollitt | B32B 1/00 |

FOREIGN PATENT DOCUMENTS

| | | |
|---|---|---|
| EP | 1724481 A1 | 11/2006 |
| EP | 2876327 A2 | 5/2015 |
| FR | 2996890 A1 | 4/2014 |
| WO | 2015001469 A1 | 1/2015 |

OTHER PUBLICATIONS

International Search Report from PCT Application No. PCT/IB2017/053531, dated Sep. 6, 2017.

Lagoda et al., "Design of an Electric Series Elastic Actuated Joint for Robotic Gait Rehabilitation Training," Proceedings of the 2010 3rd IEEE RAS & EMBS, International Conference on Biomedical Robotics and Biomechatronics, Sep. 26, 2010, pp. 21-26.

Veneman et al., "A Series Elastic- and Bowden-Cable-Based Actuation System for Use as Torque Actuator in Exoskeleton-Type Robots," The International Journal of Robotics Research, vol. 25, No. 3, Mar. 2006, pp. 261-281.

* cited by examiner

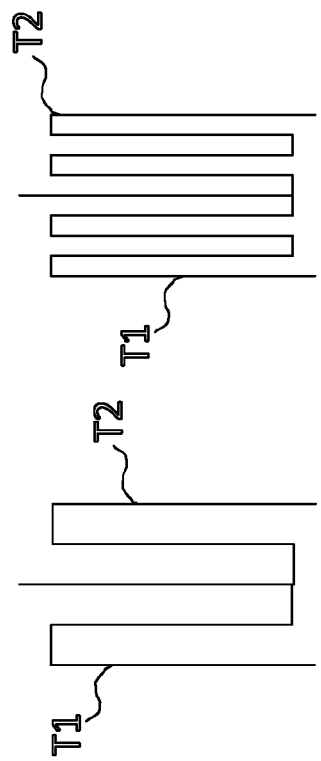
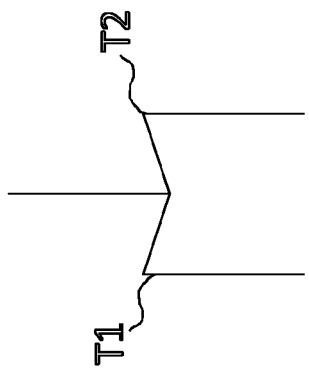
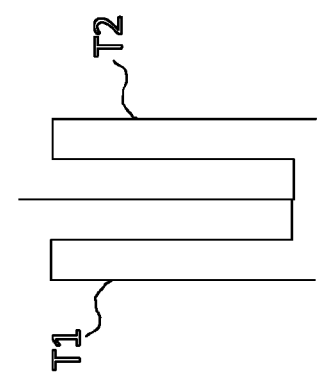
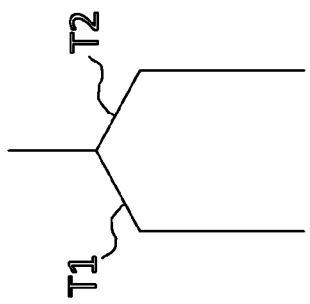
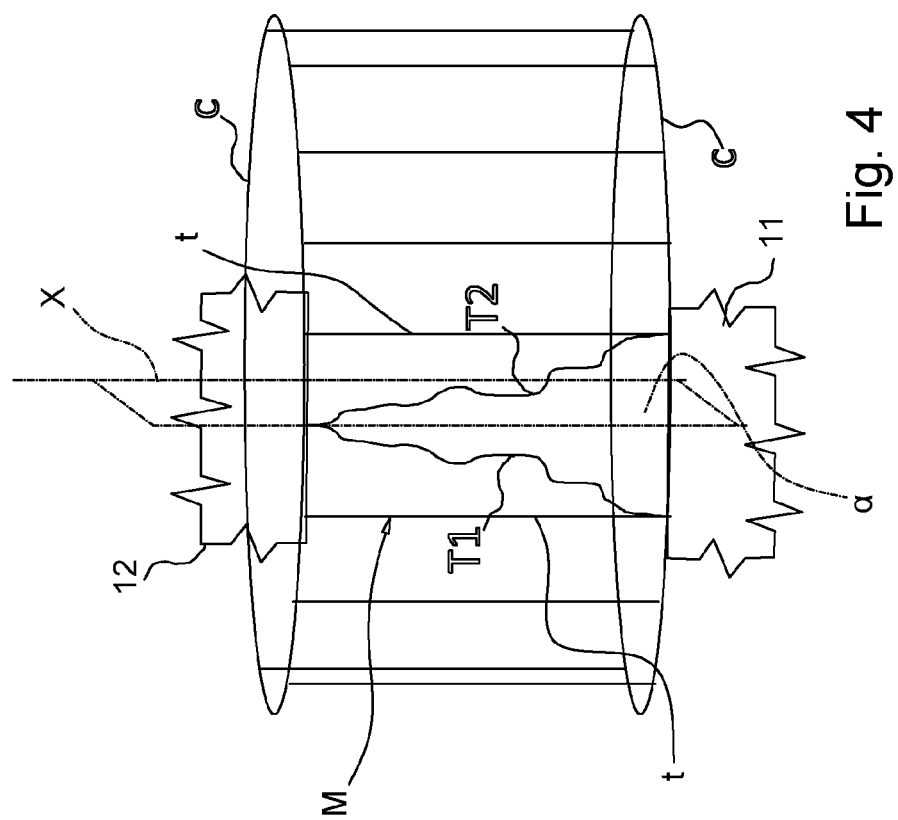

JOINT FOR TRANSMITTING A TORSIONAL LOAD WITH ELASTIC RESPONSE

TECHNICAL FIELD OF THE INVENTION

The object of the present invention is a new configuration of a joint for transmitting a torsional load with elastic response.

BACKGROUND OF THE INVENTION

A recurring need in the engineering field is to mutually attach two elements (e.g. a motor and a driven device), such that the two elements are rigidly linked as far as their rotation is concerned about a transmission axis, to transmit a rotational power around the same axis. For this purpose, the two elements or devices are therefore to be connected without the possibility of mutual rotation.

The difficulty and heavy design committment of this task (which accordingly are reflected in research costs) consist in achieving high concentricity tolerances among the two devices in order to make rotation accurate and possible without overloading the structure and/or the relative bushings. Also considering that it is uncertain that the (power) input and output devices can be perfectly aligned, the response to such problem is the use of torsional transmission joints designed indeed to remedy the alignment defects.

In doing this, in many circumstances an undesired and non-accurately quantifiable rigidity/elasticity (inherent in the material and/or the component used) is introduced in the transmission. Such factor may be significantly detrimental when the transmission of the motion is to be controlled as far as torque is concerned (in particular, the critical condition is in the inversion of motion). If, moreover, there are plastic and/or rubbery materials in the joint, viscous components are introduced, which are undesired as well, if one wants to minimize the hysteretic components between the loading and unloading cycles.

The condition of homokinetic transmission of the motion by the connecting joint is also very important. Most times indeed, a motion/drive is to be transmitted without it being altered (for example a single universal joint does not transmit motion under homokinetic conditions).

It is often also required for the torsional transmission joints to be hollow, thus leaving the possibility, when needed, of hiding the passage therein of cables, support shafts, idle shafts or other, which have a non-negligible diameter with respect to the overall sizes of the joint. This obviously causes an additional restriction to be considered when designing or selecting the joint.

To summarize, the main technical problems to deal with within the context described above may be summarized as follows:
ensuring a torque transmission between input device and output device (or actuating device and actuated device) also in the presence of undesired coaxiality defects;
accurately knowing the torsion constant of the joint in order to allow it to be used (also) as torque sensor, mechanical fuse and vibration absorption device (low-pass filter);
achieving or approximating an absence of hysteresis in the loading and unloading cycle;
providing an inner axial space available for possibly routing cables or other accessory components;
reducing the production and management/maintenance costs;
providing a joint layout that is easily adjustable and therefore can be customized;
allowing a certain, albeit contained, elastic deformation, also in the axial direction, in order to compensate for the assembly tolerances.

To the best of the applicant's knowledge, no known solution is completely satisfactory in relation to the above aspects. For example, a joint shown in EP1724481 is made in several pieces, including a flexible portion capable of giving a certain elasticity to the transmission. The flexible portion comprises fins of various nature, all arranged parallel and adapted to be deformed elastically. The geometry of the joint does not allow the mutual flexion of the two input and output axes, nor a deformation in axial direction.

Another solution generically known is shown in U.S. Pat. No. 6,241,224. Here, the device is made in a single piece but in turn it does not allow a mutual inflexion between the two input and output junction elements. Indeed, by ensuring only the mutual rotation between the elements, this device is designed to act as a torsional spring and may not be taken into consideration for making a true elastic joint.

An even further known solution is the one described in international publication WO2015/001469 which relates to a torsional spring that can also be used as a joint adapted to transmit a torsional drive with elastic response. Also in this case, the device is formed by excavating a unitary body, but it comprises a plurality of plate-like segments evolving mainly according to planes having a relation of parallelism with respect to the transmission/torsion axis; accordingly, the overall torsional behaviour of this joint can be assimilated with the one of a single imaginary equivalent plate having a length equal to the sum of the lengths of the segments, but obviously with a much more compact structure and with the connections between the segments which stiffen the structure with respect to the equivalent plate.

Due to its structure, the use of this device is not fully recommended should the coaxiality and/or the mutual axial position of the elements it connects not be sufficiently accurate. Moreover, in case of input and output elements that are not aligned with respect to the rotation/torsion axis, the device would suffer a structural weakness related with the directionality of the parallel faces forming it. Moreover, it does not provide the possibility of satisfactorily integrating cables, support shafts, idle shafts or other similar elements with axial arrangement.

Specifically within the robotics field, and in particular in the wearable robotics field, the use is frequent of elastic actuators in which an elastic element is arranged between the actuator and the actuated mechanical device or component. Examples in this regard are provided in: —J. F. Veneman, R. Ekkelenkamp, R. Kruidhof, F. C. T. van der Helm and H. van der Kooij "A Series Elastic- and Bowden-Cable-Based Actuation System for Use as Torque Actuator in Exoskeleton-Type Robots" The International Journal of Robotics Research 2006 25: 261 DOI: 10.1177/0278364906063829; and in—Claude Lagoda, Alfred C. Schouten, Arno H. A. Stienen, Edsko E. G. Hekman, Herman van der Kooij "Design of an electric Series Elastic Actuated Joint for robotic gait rehabilitation training" Proceedings of the 2010 3rd IEEE RAS EMBS International Conference on Biomedical Robotics and Biomechatronics", The University of Tokyo, Tokyo, Japan, Sep. 26-29, 2010. This second document describes in particular an example of a torsional spring, particularly an elastic actuator used in the walking rehab, made from a metal body suitably worked in order to provide the same body with the properties desired. The elastic element used in the actuator is obtained from a steel plate-like body in which two spiral-shaped slots are formed. The device thus configured has certain problems associated with hysteresis, contact between the coils which limits the applicable load and the relatively high discrepancy between the stiffness simulated with FEM analysis and the actual stiffness.

SUMMARY OF THE INVENTION

In light of the above, an object of the present invention is to provide a joint for transmitting a torsional load with elastic response which ensures transmission also in the absence of coaxiality between the two actuating and actuated devices, with a layout that can be manufactured in an affordable manner, that is easy to adjust/customize, and which allows the internal passage of cabling or possible accessory components along the transmission/torsion axis.

It is a further object of the present invention to provide a joint of the above mentioned type, of which the torsion constant can be precisely known in order to allow it to be used for various and/or complementary functions with respect to the transmission function, such as torque sensor, mechanical fuse or vibration absorption device.

It is yet a further object of the present invention to provide a joint of the above mentioned type which closely approximates, and even reaches, the condition of lack of hysteresis in the loading and unloading cycle.

It is then an object of the present invention to provide a joint of the above mentioned type which has a certain elastic deformability also with respect to a load in the axial direction.

These and other objects are achieved with the joint for transmitting a torsional load with elastic response according to the present invention, the essential features of which are defined in the first of the appended claims. Further optional yet significant features are defined by the dependent claims.

BRIEF DESCRIPTION OF THE DRAWINGS

The features and advantages of the joint for transmitting a torsional load with elastic response according to the present invention shall become apparent from the description below of embodiments thereof, made by way of example and not limitative, with reference to the accompanying drawings in which:

FIG. 4 is a schematic depiction useful to show, more generally, the structural principle of the joint according to the invention; and FIGS. 5a to 5d are diagrams that follow the depiction scheme of FIG. 4 and consistently with the latter show respective joint modules according to various embodiments of the invention; the drawings in FIG. 5a and FIG. 5b correspond in particular respectively to the first embodiment (as per the previous FIGS. 1 and 2) and to the second embodiment (as per FIG. 3);

DETAILED DESCRIPTION OF THE INVENTION

Figure 1:
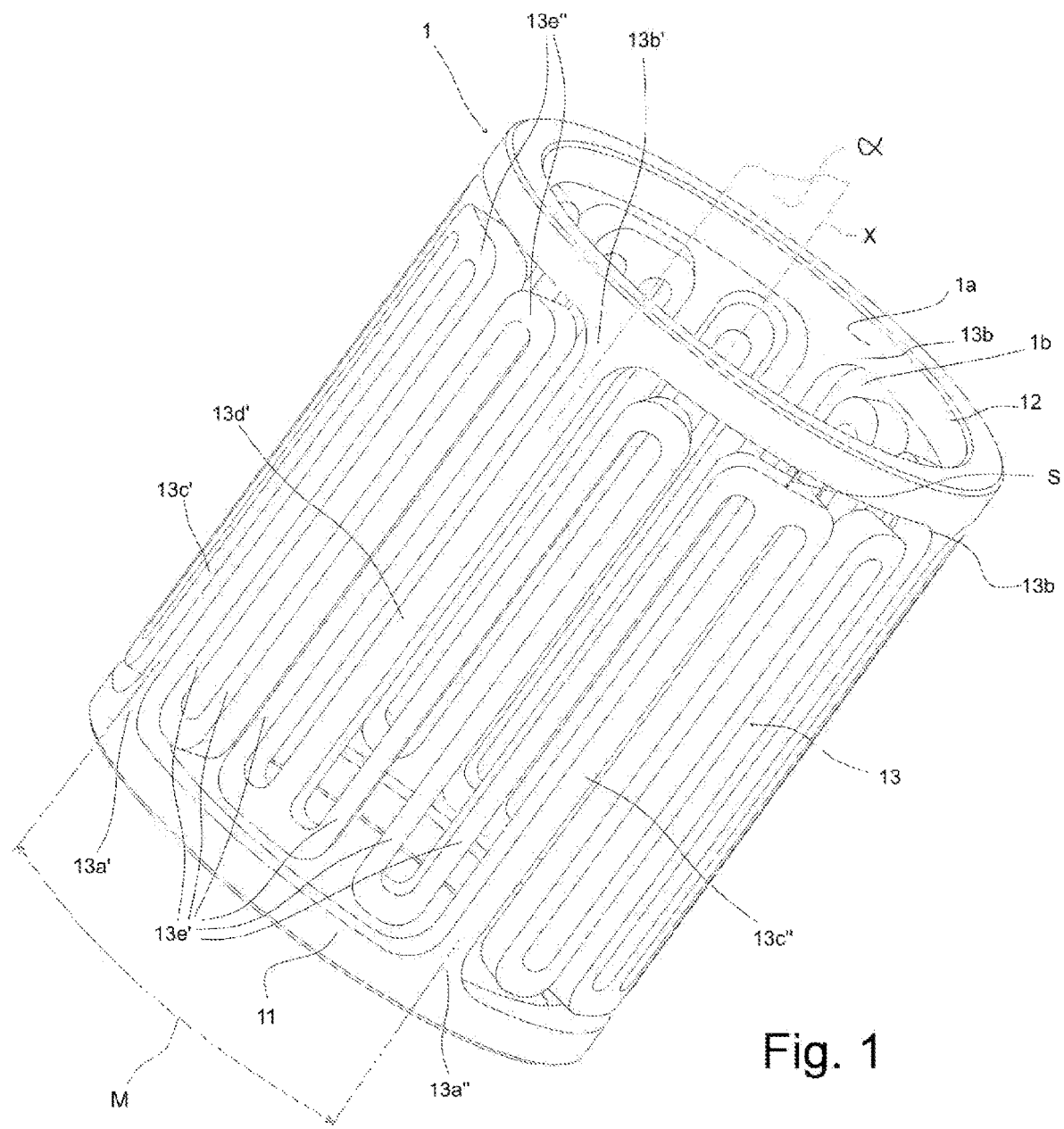
FIG. 1 is an axonometric view of a joint according to a first embodiment of the invention.
Figure 2:
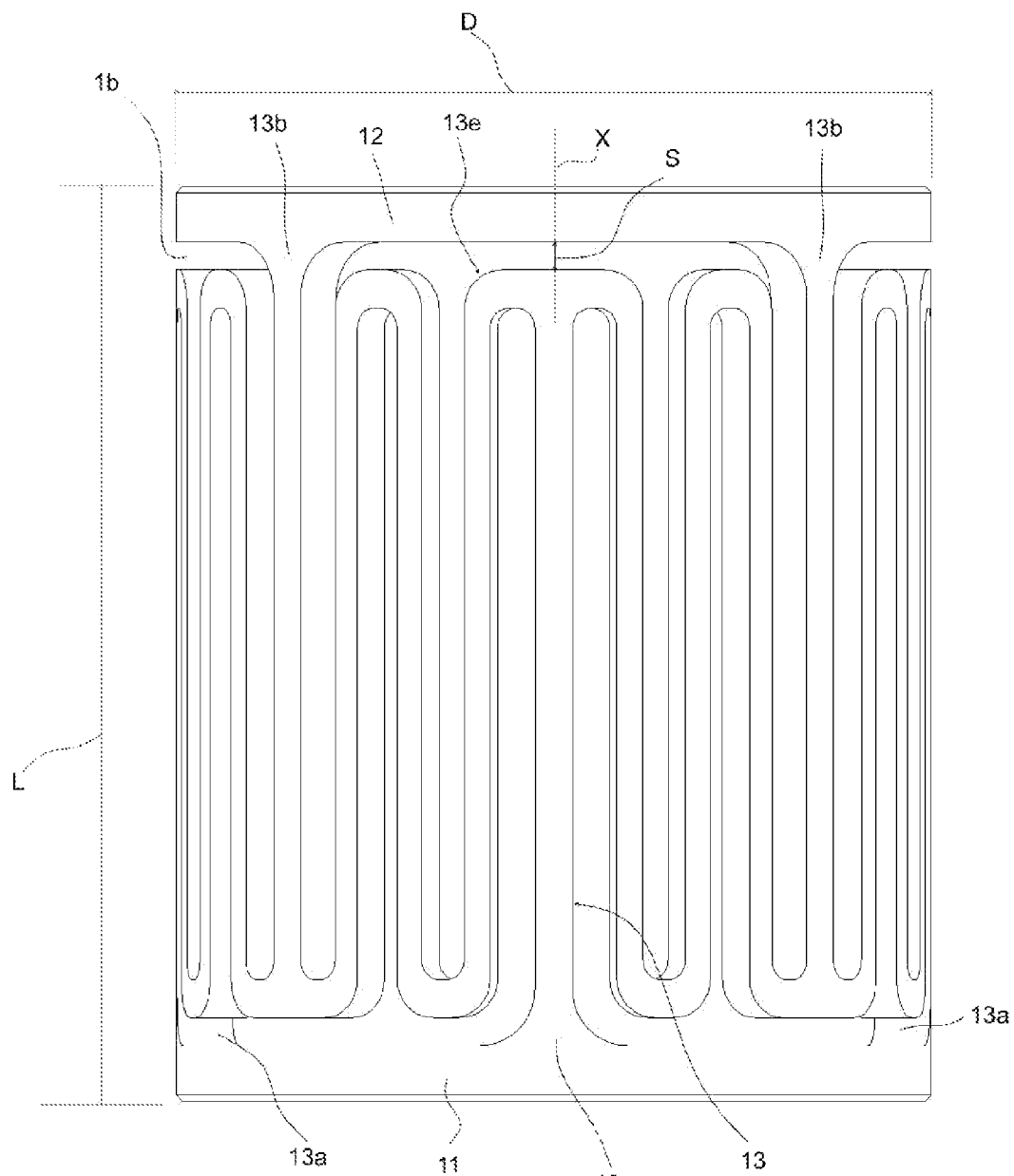
FIG. 2 is a side view of the joint in FIG. 1.

With reference for the time being to FIGS. 1 and 2, a joint according to the present invention is obtained starting from a unitary body 1, typically a metal body, having a tubular structure, where tubular means generically a hollow structure, evolving around an inner cavity 1a, with an axial symmetry. In particular, as in the first embodiment shown in the cited figures, the body can be, according to a preferred solution, a cylinder having a central axis X and a circular basis; however, more generally speaking, the basic outline of the body (that is, the outer perimeter of the section on a transversal plane orthogonal to the central axis) may be polygonal, thus resulting in a prismatic shape of the body. Even more generally, such basic outline may also vary in size along the central axis, that is, remaining identical to itself aside from a scale factor (which will preferably be comprised between 1 and 3, both ends included); in this case the body can take on, for example, a hourglass shape or a barrel shape. The body 1 has an elongation L measured along the axis X. The diameter of the basic outline, here the outer diameter of the circular section of the body, is indicated with D. The ratio between L and D may vary substantially at will, even though for most applications, a ratio of $L/D \geq 1$ may be advantageous.

According to the invention, the body 1 has a distribution of slots 1b formed through removal or excavation of material, this resulting in a windowed structure of the body, wherein the inner cavity 1a is opened outwards through the slots, and the remaining solid material defines a pattern (that is a path or mesh) of beam-shaped members 13 which join two annular elements 11, 12. The latter elements are arranged at respective axial ends of the body, and are therefore spaced, lying over respective planes orthogonal with the central axis. The beam-shaped members are to be intended as members in which a direction of elongation can be defined and is predominant, which direction makes it possible to schematize the pattern with a linear two-dimensional geometry, the lines being defined by the median line or longitudinal axis/direction of each beam member.

The annular elements 11, 12 are adapted for the mechanical connection respectively with an actuating device (or actuator) and an actuated device (or load), between which a rotational drive is to be transmitted through the joint by stressing the joint to torsion around the axis X, which is practically the fulcrum axis of the torque or twisting couple to be exchanged (between the actuator and the load) by means of the joint itself. The mechanical connection system is not represented since it may be any system of type in itself known for interfacing the joint with various types of mechanical components. Usable connections/fastenings include flanged connections with screws, shaft-hub connections, grooved outlines, keys, tabs, radial pins, shrink disks, etc.

Specifically regarding the beam-shaped pattern 13, it has a plurality of junctions 13a, 13b which are integral (i.e. one-piece) with the two annular elements 11, 12, in the same number for each annular element (here four), which are regularly spaced following the circular perimeter of the annular element (or more generally, the direction defined by a circle circumscribing the basic outline of the body). The sequence of the junctions provides alternatively a junction to a first annular element 11 and a junction to a second annular element 12, where obviously "first" and "second" are entirely interchangeable references.

Two consecutive junctions on the same annular element, or more precisely their midpoints, define a module M of the pattern which repeats serially in identical form for a certain number of times (at least two) when following the aforesaid circle, wherein two consecutive modules clearly share at least one junction. For example, among the above-mentioned two junctions to the first annular element 11 (indicated with 13a' and 13a" in FIG. 1), the module M includes one junction 13b' to the opposite annular element (or second annular element 12), which midpoint identifies, with the central axis X, a plane a of inner mirror-image symmetry of the module M.

In practice, the evolution or geometric path of the beams forming the pattern between one of the end junctions 13a' of the module M to the first annular element 11 and the "central" junction 13b' of the module to the second annular element 12 mirrors the evolution or path which joins such central junction 13b' to the other end junction 13a", with respect to the plane a passing through the axis X and the midpoint of the central junction. Generally speaking, said path substantially follows a curved line, typically but not necessarily having a variable curvature, a polyline with at least three straight line segments, or a combination of straight line segments and curved lines even having variable curvature.

In particular, in the module according to the presently described embodiment, a main beam-shaped member 13c', 13c" and 13d' (the first two respectively from the two end junctions and the third from the central junction) branches off from each junction, extending axially, that is along a generatrix parallel to the axis X, with the first end of each member integral with the relative annular element and which identifies the junction, and the second end which reaches close to the opposite annular element by a distance S measured axially which advantageously may be equal to or less than about ⅕ of the elongation L.

Such second ends, or more precisely each second end and the second end of the consecutive main beam-shaped member (projecting from different annular elements: here therefore, for example, the second end of the main beam-shaped member 13d' and the second end of the main beam-shaped member 13c'), are then joined by connection members 13e which according to the present embodiment, preferably have a serpentine shape, comprising at least one axial beam-shaped segment 13e' (three here) extending parallel to the axis X for a length for example, equal to about L−2·S. Therefore, in this embodiment, the slots define a plurality of beam-shaped members/segments that are regularly spaced following the circumferential direction, the spacing being variable depending on the circumstances of use, absolute size and proportions of the body etc. The serpentine shape is then completed by circumferential bridging segments 13e", with corners that, though rounded, are in any case substantially at right angles, and that can degenerate into sharp portions when the distance between two axial segments is close like in the example.

Figure 3:
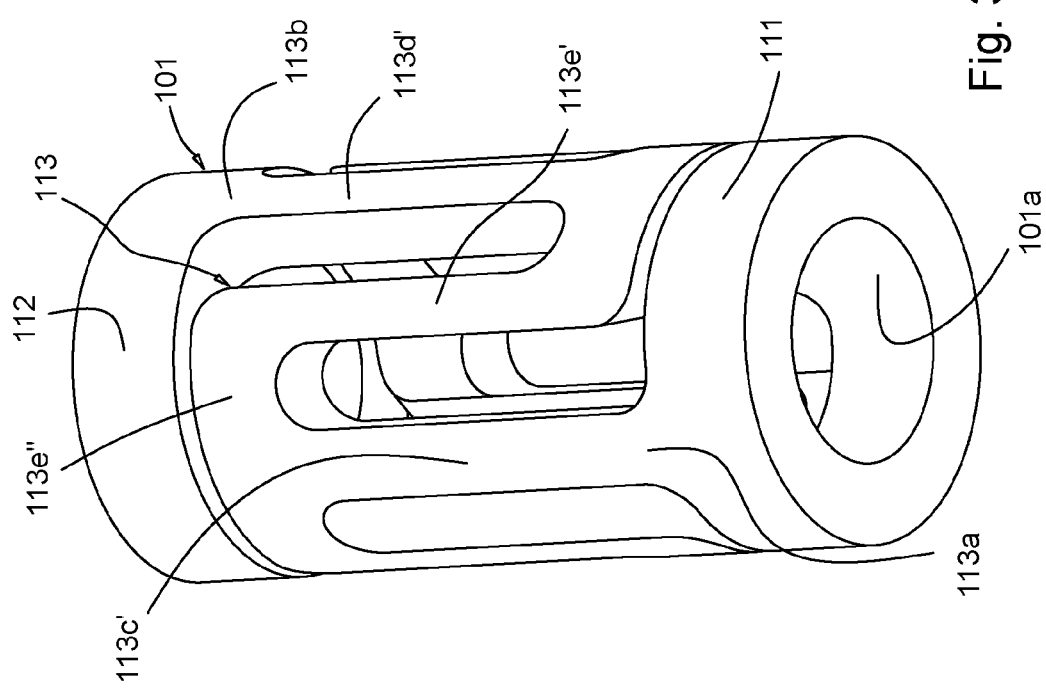
FIG. 3 is an axonometric view of a joint according to a second embodiment of the invention.

With reference to FIG. 3, a second embodiment of the invention is practically a close variant of the first one just described, as can also be understood by the use of consistent and self-explanatory reference numerals. Here, the annular elements and the beam-shaped members are thicker both in the radial direction (due to the effect of a tubular body with an inner cavity having a reduced size in relation to the outer diameter D) and in the axial direction (as far as the annular elements and the circumferential beam-shaped segments are concerned) and circumferential direction (as far as the axial beam-shaped members/segments). In terms of the evolution of the pattern, it is worth noting here the provision of a serpentine shape with a single axial segment between two consecutive main beam-shaped members.

With reference then also to FIGS. 4 to 5d, geometric schematizations are provided of various possible beam patterns in a joint according to the invention. More specifically, FIGS. 5a and 5b show respective schematizations of a module M of the first and the second embodiment. In these representations, the inner pattern of the module is expressed in the more generic terms of the relevant paths, as already mentioned above, that are mutually symmetrical with respect to the plane a and here indicated with T1, T2, each evolving between one junction to an annular element and the consecutive junction to the other annular element. In the two examples taken into consideration, the path of the pattern is practically a polyline having several straight segments, an expedient that, clearly, can be pursued also by other examples alike the ones in FIGS. 5c and 5d, having main axial beam-shaped members with a shorter axial elongation, which are joined by simple connection segments, here for example with a certain slanting (not right) angle.

But even more generally, as shown in FIG. 4, the paths T1 and T2 may follow curved lines or combinations of straight line segments with parts of a curved line, for example and typically according to a spline function. In this figure, in which the development of the circle c circumscribed to the basic outline of the body is also marked (a basic outline that, as mentioned, may not be circular), it is also worth noting a possible preferred solution, according to which the tangent t to the path at the junction to the respective annular element is a generatrix of the cylinder having its base in the circle c, and the module M extends between two generatrices/tangents t in two consecutive junctions on the same annular element.

The joint according to the invention, as in particular implemented based on the examples described above, but in general according to the features defined by the main appended claim, completely achieves the objects set out in the introductory part. The elastic joint here proposed is remarkably simple from a manufacturing standpoint, in particular by making use of laser cutting technology for metal materials; besides, the design considerations are assisted by the fact that the equivalent stiffness can be easily determined.

This results in affordable costs and a straightforward customization of the properties.

Since the body 1 is a single metal piece, when remaining in the range of elastic deformation, the advantage is attained of not dealing with hysteresis in the loading and unloading cycles. Moreover, precisely for making use of a single piece rigid body, the joint is a CV joint (aside from the deformation, which however is linear and known).

Due to its geometry, the joint allows for an intrinsic adjustment between the input and output axes when the coaxiality tolerance is not perfectly complied with. For it being inherently elastic, the joint is also compliant with an axial elasticity component which is useful when there is hyperstaticity between actuating and actuated device.

Finally, the elastic joint leaves an inner free space (indeed a remarkable one if compared to the overall bulk of the joint) for the arrangement of accessory components (wiring etc.) coaxially to the input and output devices.

Figure 6A:
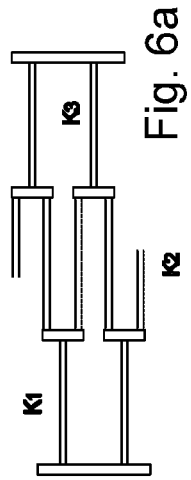
FIGS. 6a to 6c are schematizations of the joint according to the invention, and more specifically according to the second embodiment in FIG. 3, that outline the joint in terms of a system of cantilever beams and relative equivalent springs.
Figure 6B:
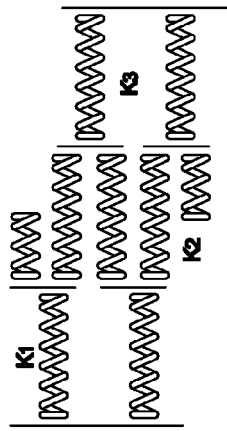
Figure 6C:
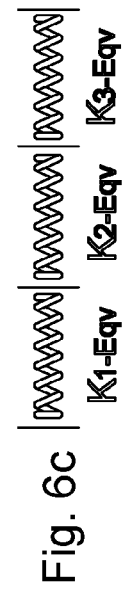

Considering more thoroughly the issue of identifying the equivalent torsional rigidity, this can be easily calculated because, to a very good approximation, the beam-shaped components of the examples indicated above can be considered for example as an appropriate combination of cantilever beams, according to the schemes in FIGS. 6a to 6c which can be interpreted in light of the following formulas:

$$\delta_{1\ldots n} = \frac{\left(\frac{M_t}{R}\right) * L_{1\ldots n}^3}{3EI}$$

$$K_{1\ldots n} = \frac{M_t}{2\pi * \delta_{1\ldots n}}$$

$$\frac{1}{K_{eqv}} = \frac{n_1}{K_1} + \ldots + \frac{n_n}{K_n}.$$

In which:
$M_t$=Twisting couple [N·mm]
R=Average radius of the cylinder [mm]
$L_{1\ldots n}$=Free length of the beams [mm]
$I_{1\ldots n}$=Flexural moments of inertia [mm$^4$]
E=Young's modulus [Mpa]
$\delta_{1\ldots n}$=Cantilever beam inflexion [mm]
$K_{1\ldots n}$=Elastic constant of the spring [N·mm/rad]
$K_{eqv}$=Overall equivalent elastic constant of the elastic joint [N·mm/rad]

The desired stiffness can be optimized by acting on the various geometric parameters, such as in particular, as mentioned, the thickness and the sizes of the beam-shaped segments or members. Obviously, a fundamental variable for obtaining the features desired is the material used: the most suitable materials are the metal materials used generally for mechanical constructions. Among them, steel, aluminium alloys and titanium alloys. Primarily, the fundamental value for choosing and obtaining the desired stiffness properties of the joint can be identified in the Young's modulus of the material. The selection of the material to be used, as well as the desired stiffness, is in a direct connection with the extent of the load that the joint has to bear and the level of dimensional compactness that one wishes to obtain.

Then, to summarize, the slots can be made with laser cutting systems on a basic tubular body made of metal, such as a generally resistant and flexible steel e, e.g. spring steel (for example, Bohler W720 maraging steel with a Young's modulus of 193 GPa and a yield stress of 1815 MPa). As far as compatible with the size of the slots and with the size of the cross-section of the whole element, manufacturing by traditional metal working machines (stock removal machining) may also be possible.

Other advantages which may result from using the joint according to the invention comprise:
the joint is usable for transmissions requiring an elastic joint between input and output with a known stiffness or torsion constant, without hysteresis and as a low-pass filter;
it can be coupled with a position transducer (e.g. a rotary encoder) as sensitive element for highly accurate torque sensors, which can be customized, provided with an axial bore and at a low cost;
usability simply as a hollow torsional spring.

The joint may have several applications, among which one of particular interest being robotics, and in particular wearable robotics. The sizes thereof and its features of rigidity and transmittable torque and its increased capability to be interfaced with the other elements make it a useful element for making elastic actuators for wearable robots and for robots generally. In these applications, it is indeed fundamental to use actuators provided with intrinsic compliance, with limited weights and volumes, albeit with the need to transmit relatively high torques and forces. The joint according to the invention, complete with all elements, may be assembled directly on the robot.

The present invention was described hereto with reference to preferred embodiments thereof. It is intended that other embodiments may exist which relate to the same inventive concept within the scope of protection of the claims here attached.

The invention claimed is:

1. A transmissive joint with elastic response for transmitting a torsional load between an actuating and an actuated device, the joint comprising a unitary body having a tubular structure defined as a hollow structure evolving around an inner cavity with an axial symmetry and around a central or longitudinal axis, the body showing a basic outline defined by sections on any planes orthogonal with said axis that are mutually identical aside from a scale factor; a distribution of slots being formed in said body through removal of material, said slots defining the following elements in the same body:
   at respective longitudinal ends of said body, a first and second annular element, lying over planes orthogonal with said central axis and spaced along it, said annular elements being adapted for a mechanical connection with the actuating or the actuated device; and
   a beam-shaped pattern extending between said annular elements and providing for a plurality of junctions to respective of said elements;
   wherein said junctions are in the same number for each annular element and regularly spaced following a direction defined by a circle circumscribed to said outline, in a sequence that comprises alternatively a junction to the first annular element and a junction to the second annular element;
   and wherein said pattern comprises at least two modules each comprised between the midpoint of respective consecutive junctions on the same annular element, said modules repeating serially along said circumference, at least one junction being shared among two adjacent modules, the modules having each an internal symmetry mirrored with respect to plane ($\alpha$) passing through said central axis and for the midpoint of the single junction of the module to the opposed annular element; and wherein between a junction to an annular element and the consecutive junction to the other annular element said pattern follows a path substantially in accordance with a curved line, a polyline with at least three straight line segments, or a combination of straight line segments and curved lines;
   wherein each of said modules comprise three main beam-shaped members extending in an essentially axial direction starting from respective first ends that define respective spaced junctions alternatively to said first and second annular element and having each a second end axially spaced from the annular element opposed to the element to which the first end is integral, the module further comprising one or more connection members joining the second end of each main beam-shaped member to the second end of at least one beam-shaped member that is circumferentially consecutive in the same module;
   wherein said connection members develop according to a serpentine shape, comprising at least one axial beam-shaped segment extending parallel with said central axis.

2. The transmissive joint according to claim 1, wherein said body has an elongation along said central axis equal to or greater than the diameter of said circle circumscribing the outline.

3. The transmissive joint according to claim 1, wherein said at least one axial beam-shaped segment extends axially for a length equal to said elongation minus twice said gap distance.

4. The transmissive joint according to claim 1, wherein said connection members further comprise a plurality of circumferential bridging segments that extend between two axial beam-shaped segments and/or between an axial beam-shaped segment and a main beam-shaped member.

5. The transmissive joint according to claim 1, wherein said connection members comprise single connection segments each extending between two main beam-shaped members that are consecutive following a circumferential direction and project from two different annular members.

6. The transmissive joint according to claim 1, wherein the tangent to said path at the junction to the respective annular member is a generatrix of a cylinder having a base outlined by said circle, said module being comprised between two generatrices/tangents at two consecutive junctions to the same annular member.

7. The transmissive joint according to claim 1, wherein said scale factor is higher than or equal to 1 and lower than or equal to 3.

8. The transmissive joint according to claim 1, wherein said body is cylindrical with a circular basis.

9. The transmissive joint according to claim 1, wherein said body is prismatic.

10. A transmissive joint with elastic response for transmitting a torsional load between an actuating and an actuated device, the joint comprising a unitary body having a tubular structure defined as a hollow structure evolving around an inner cavity with an axial symmetry and around a central or longitudinal axis, the body showing a basic outline defined by sections on any planes orthogonal with said axis that are mutually identical aside from a scale factor; a distribution of slots being formed in said body through removal of material, said slots defining the following elements in the same body:

- at respective longitudinal ends of said body, a first and second annular element, lying over planes orthogonal with said central axis and spaced along it, said annular elements being adapted for a mechanical connection with the actuating or the actuated device; and
- a beam-shaped pattern extending between said annular elements and providing for a plurality of junctions to respective of said elements;
- wherein said junctions are in the same number for each annular element and regularly spaced following a direction defined by a circle circumscribed to said outline, in a sequence that comprises alternatively a junction to the first annular element and a junction to the second annular element;
- and wherein said pattern comprises at least two modules each comprised between the midpoint of respective consecutive junctions on the same annular element, said modules repeating serially along said circumference, at least one junction being shared among two adjacent modules, the modules having each an internal symmetry mirrored with respect to plane (α) passing through said central axis and for the midpoint of the single junction of the module to the opposed annular element; and wherein between a junction to an annular element and the consecutive junction to the other annular element said pattern follows a path substantially in accordance with a curved line, a polyline with at least three straight line segments, or a combination of straight line segments and curved lines;
- wherein said body has an elongation along said central axis equal to or greater than the diameter of said circle circumscribing the outline;
- wherein each of said modules comprise three main beam-shaped members extending in an essentially axial direction starting from respective first ends that define respective spaced junctions alternatively to said first and second annular element and having each a second end axially spaced from the annular element opposed to the element to which the first end is integral, the module further comprising one or more connection members joining the second end of each main beam-shaped member to the second end of at least one beam-shaped member that is circumferentially consecutive in the same module;
- wherein the second end of each main beam-shaped member is axially spaced from the annular element opposed to the element to which the first end is integral by a gap distance not greater than ⅕ of said elongation;
- wherein said connection members develop according to a serpentine shape, comprising at least one axial beam-shaped segment extending parallel with said central axis.

11. The transmissive joint according to claim 10, wherein said at least one axial beam-shaped segment extends axially for a length equal to said elongation minus twice said gap distance.

12. The transmissive joint according to claim 10, wherein said connection members further comprise a plurality of circumferential bridging segments that extend between two axial beam-shaped segments and/or between an axial beam-shaped segment and a main beam-shaped member.

\* \* \* \* \*